G. ZEIN.
SCALE SCRAPER FOR BOILER RIVETS.
APPLICATION FILED FEB. 10, 1909.
949,513.
Patented Feb. 15, 1910.
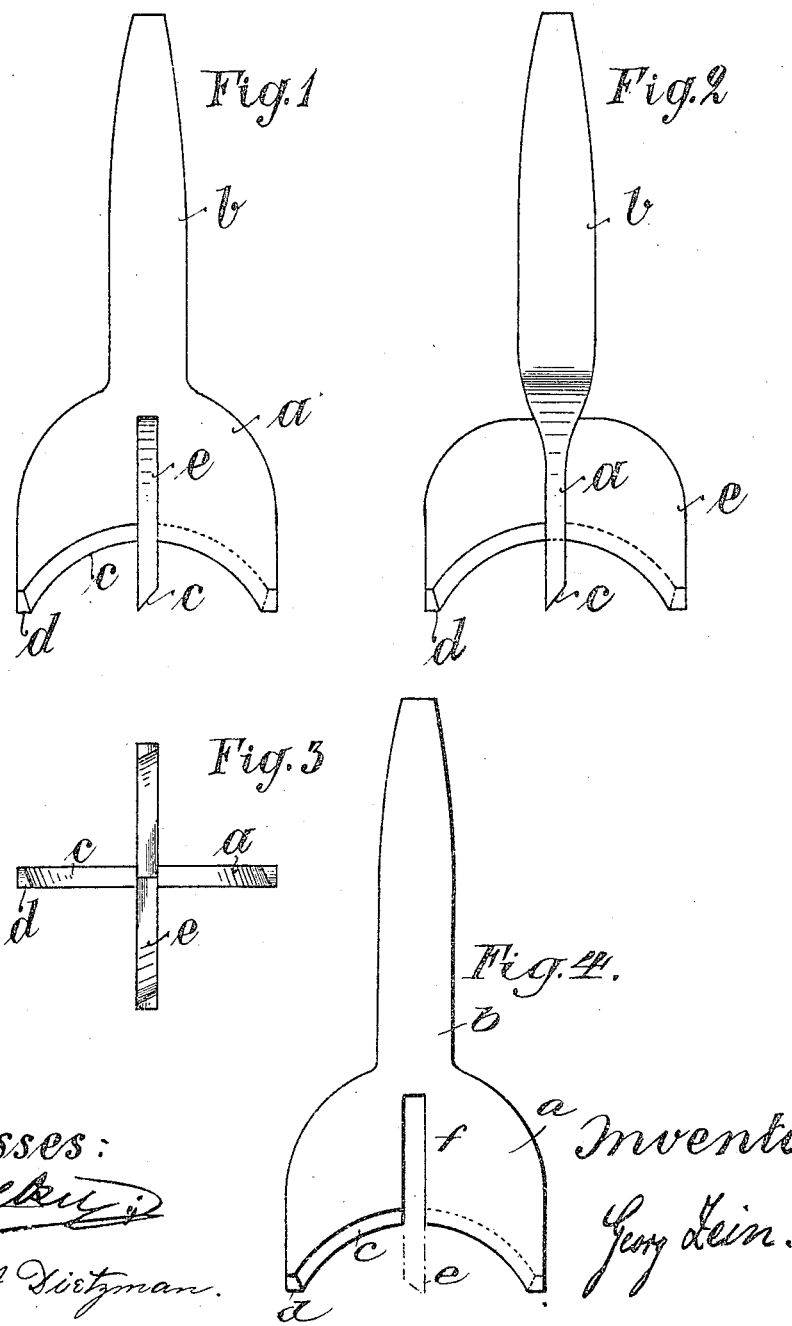

UNITED STATES PATENT OFFICE.

GEORG ZEIN, OF SEBNITZ, GERMANY.

SCALE-SCRAPER FOR BOILER-RIVETS.

949,513.  Specification of Letters Patent.  Patented Feb. 15, 1910.

Application filed February 10, 1909. Serial No. 477,142.

*To all whom it may concern:*

Be it known that I, GEORG ZEIN, a subject of the King of Saxony, and resident of Sebnitz, in Saxony, Germany, have invented certain new and useful Improvements in Scale-Scrapers for Boiler-Rivets, of which the following is a specification.

It is a well known fact, that the cleansing of boilers and particularly the removing of the scale adhering to the rivets is very difficult and requires much time.

The present invention relates to an apparatus by means of which the scale is easily scraped off the rivets and off the metal which immediately surrounds the rivet.

The apparatus is of very simple construction and essentially consists of a piece of metal having a sharp edge which, if the scraper is being revolved, is displaced in the direction of the outer surface of a rivet head.

The scraper is shown by way of example in the accompanying drawings in which—

Figure 1 is a side view. Fig. 2 is an elevation seen at right angle to Fig. 1. Fig. 3 is a plan of Fig. 1 seen from below. Fig. 4 is a view of the knife according to Fig. 2 without the transverse blade.

The scale scraper for rivets consists of a knife $a$ with handle $b$ adapted to be inserted into any socket of a drill chuck or other device. The cutting edge $c$ of the knife $a$ is concave and beveled for one half of its length in one direction and for the other half of its length in the opposite direction so that, if the handle is turned for 360° the two halves of the cutting edge scrape over the entire surface of the rivet head. Horizontal extensions $d$ at the outer ends of the cutting edge serve for scraping the metal immediately around the rivet.

The effect of the apparatus can be increased by providing several cutting edges. As shown in the drawing, there is, for example, arranged a second knife $e$ with a cutting edge similar to the cutting edge of knife $a$ and standing at right angles to said knife $a$. The second knife $e$ is fixed in a vertical slot $f$ of knife $a$ so that it can be easily removed.

The scraper can be operated by hand or by any suitable mechanical means.

I claim:—

1. A scale scraper for rivet heads of a boiler comprising in combination a knife, a handle for said knife adapted to be inserted in any suitable device for operating the scraper, said knife having a cutting edge which is arc shaped and has one half of the edge turned in opposite direction to the other half, and horizontal extensions at each end of the cutting edge, substantially as described and for the purpose set forth.

2. An improved scale-scraper for rivet heads of a boiler comprising in combination a handle, a knife body with concave lower surface fixed to said handle and having a vertical slot extending upward from the center of its lower surface, a cutting edge composed of two halves turned in opposite directions and horizontal extensions of said cutting edge at each end of the same; and a second knife of identical construction inserted in the said vertical slot of the first knife body, substantially as described and for the purpose set forth.

In witness whereof I have hereunto set my hand in the presence of two witnesses.

GEORG ZEIN.

Witnesses:
  WILLIAM J. KONJETSNY,
  FREDERICK J. DIETZMAN.